United States Patent
Payne et al.

(10) Patent No.: US 10,189,453 B2
(45) Date of Patent: Jan. 29, 2019

(54) COASTING GUIDANCE TIMING AND DRIVE FORCE ADJUSTMENT

(71) Applicant: Toyota Motor Engineering & Manufacturing North America, Inc., Erlanger, KY (US)

(72) Inventors: Joshua D. Payne, Ann Arbor, MI (US); Christopher M. Bulpitt, Los Angeles, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/286,439

(22) Filed: Oct. 5, 2016

(65) Prior Publication Data

US 2018/0093650 A1    Apr. 5, 2018

(51) Int. Cl.
*B60T 8/172*    (2006.01)
*B60T 7/22*    (2006.01)

(52) U.S. Cl.
CPC .............. *B60T 8/172* (2013.01); *B60T 7/22* (2013.01); *B60T 2201/02* (2013.01); *B60T 2210/32* (2013.01); *B60T 2210/36* (2013.01); *B60T 2270/604* (2013.01)

(58) Field of Classification Search
None
See application file for complete search history.

(56) References Cited

U.S. PATENT DOCUMENTS

| 5,239,472 A | 8/1993 | Long et al. |
| 5,521,579 A | 5/1996 | Bernhard |
| 5,521,823 A | 5/1996 | Akita et al. |
| 5,815,072 A | 9/1998 | Yamanaka et al. |

(Continued)

FOREIGN PATENT DOCUMENTS

| DE | 102010038106 | 4/2012 |
| DE | 102011083013 | 3/2013 |
| EP | 2790950 | 7/2015 |

OTHER PUBLICATIONS

Robert Oshana & Mark Kraeling, Software Engineering for Embedded Systems: Methods, Practical Techniques, and Applications (2013) (Year: 2013).*

(Continued)

*Primary Examiner* — Tamara L Weber
(74) *Attorney, Agent, or Firm* — Snell & Wilmer LLP

(57) ABSTRACT

Methods, systems, and apparatus for adjusting coasting guidance and control. The coasting guidance system includes a user interface for displaying coasting information. The coasting guidance system includes an electronic control unit coupled to the user interface and configured to determine a location of a stop event. The electronic control unit is configured to determine a braking location and a target speed based on the location of the stop event. The electronic control unit is configured to determine an ideal coasting location based on the braking location and determine an actual coasting location. The actual coasting location is where the driver begins coasting. The electronic control unit is configured to control a deceleration drive force of the (Continued)

vehicle to decelerate the vehicle to the target speed at the braking location based on the braking location, the actual coasting location and the ideal coasting location.

19 Claims, 7 Drawing Sheets

(56) References Cited

U.S. PATENT DOCUMENTS

| | | | |
|---|---|---|---|
| 5,838,259 | A | 11/1998 | Tonkin |
| 6,208,927 | B1 | 3/2001 | Mine et al. |
| 6,321,158 | B1 | 11/2001 | DeLorme et al. |
| 6,336,038 | B1 | 1/2002 | Nojima et al. |
| 6,584,395 | B2 | 6/2003 | Satou et al. |
| 6,681,170 | B2 | 1/2004 | Winner et al. |
| 6,694,806 | B2 | 2/2004 | Kumagai et al. |
| 6,711,474 | B1 | 3/2004 | Treyz et al. |
| 6,871,145 | B2 | 3/2005 | Altan et al. |
| 7,212,905 | B2 | 5/2007 | Grill |
| 7,237,203 | B1 | 6/2007 | Kuenzner |
| 7,331,899 | B2 | 2/2008 | Ortmann et al. |
| 7,404,784 | B2 | 7/2008 | De Mersseman |
| 7,848,867 | B2 | 12/2010 | Ueno |
| 8,083,015 | B2 | 12/2011 | Kobayashi |
| 8,140,265 | B2 | 3/2012 | Grush |
| 8,185,296 | B2 | 5/2012 | Yokoyama et al. |
| 8,187,149 | B2 | 5/2012 | Koenig et al. |
| 8,204,665 | B2 | 6/2012 | Takeuchi et al. |
| 8,246,506 | B2 | 8/2012 | Matsubara et al. |
| 8,290,637 | B2 | 10/2012 | Krupadanam et al. |
| 8,384,532 | B2 | 2/2013 | Szczerba et al. |
| 8,483,949 | B2 | 7/2013 | Taguchi et al. |
| 8,538,462 | B2 | 9/2013 | Forstall et al. |
| 8,764,124 | B2 | 1/2014 | Furuyama |
| 8,670,888 | B1 | 3/2014 | Brenner |
| 8,680,979 | B2 | 3/2014 | Hoffmeister |
| 8,706,379 | B2 | 4/2014 | Jang |
| 8,718,891 | B2 | 5/2014 | DeWitt et al. |
| 8,731,788 | B2 | 5/2014 | Sujan et al. |
| 8,742,908 | B2 | 6/2014 | Boudy |
| 8,767,379 | B2 | 7/2014 | Whitaker |
| 8,784,267 | B2 | 7/2014 | Staudinger et al. |
| 8,849,507 | B2 | 9/2014 | Popp et al. |
| 8,917,171 | B2 | 12/2014 | Anderson et al. |
| 8,966,654 | B1 | 2/2015 | Kwak |
| 8,994,524 | B2 | 3/2015 | Fritz et al. |
| 9,013,292 | B2 | 4/2015 | Aberizk |
| 9,026,348 | B2 | 5/2015 | Ichinokawa |
| 9,050,935 | B2 | 6/2015 | Stefan et al. |
| 9,052,713 | B2 | 6/2015 | Schulz et al. |
| 9,073,540 | B2 | 7/2015 | Cauthen |
| 9,108,570 | B2 | 8/2015 | Giangrande |
| 9,121,719 | B2 | 9/2015 | Stankoulov |
| 9,168,896 | B2 | 10/2015 | Kim |
| 9,205,740 | B2 | 12/2015 | Jacobi et al. |
| 9,205,843 | B2 | 12/2015 | Sannodo et al. |
| 9,207,091 | B2 | 12/2015 | Ota et al. |
| 9,227,626 | B2 | 1/2016 | Pandit et al. |
| 9,229,457 | B2 | 1/2016 | Huelsebusch et al. |
| 9,238,412 | B2 | 1/2016 | Kidston et al. |
| 9,242,631 | B2 | 1/2016 | Tanaka et al. |
| 9,327,730 | B2 | 5/2016 | Miller et al. |
| 9,347,784 | B2 | 5/2016 | Inoue et al. |
| 2006/0125616 | A1 | 7/2006 | Song |
| 2006/0190173 | A1 | 8/2006 | Ogura |
| 2006/0290202 | A1 | 12/2006 | Shibata et al. |
| 2007/0102208 | A1 | 5/2007 | Okuda et al. |
| 2007/0129012 | A1 | 7/2007 | Snow |
| 2008/0201050 | A1 | 8/2008 | Placke et al. |
| 2010/0201505 | A1 | 8/2010 | Honary et al. |
| 2010/0256848 | A1 | 10/2010 | Sasaki et al. |
| 2011/0187520 | A1 | 8/2011 | Filev et al. |
| 2012/0078496 | A1 | 3/2012 | Lindhuber et al. |
| 2012/0095670 | A1 | 4/2012 | Piggott |
| 2012/0330505 | A1 | 12/2012 | Tsumori et al. |
| 2013/0162009 | A1 | 6/2013 | Mitts et al. |
| 2013/0268162 | A1 | 10/2013 | Ponziani |
| 2013/0274958 | A1 | 10/2013 | Uno |
| 2013/0289874 | A1* | 10/2013 | Taguchi ............ B60W 30/146 701/533 |
| 2014/0067225 | A1 | 3/2014 | Lee et al. |
| 2014/0156171 | A1 | 6/2014 | Kono et al. |
| 2014/0156188 | A1 | 6/2014 | Hart et al. |
| 2014/0172208 | A1 | 6/2014 | Limbacher et al. |
| 2014/0180564 | A1* | 6/2014 | Ichinokawa ........ B60W 50/14 701/123 |
| 2014/0324317 | A1 | 10/2014 | Schilling et al. |
| 2014/0335994 | A1 | 11/2014 | Otake |
| 2015/0258984 | A1* | 9/2015 | Atluri ................ B60W 10/06 701/22 |
| 2015/0259008 | A1 | 9/2015 | Seguchi |
| 2015/0274169 | A1 | 10/2015 | Attard et al. |
| 2015/0307097 | A1 | 10/2015 | Steinmeyer et al. |
| 2015/0329119 | A1 | 11/2015 | Sujan et al. |
| 2015/0337789 | A1 | 11/2015 | Matsunaga et al. |
| 2016/0050315 | A1 | 2/2016 | Malhotra et al. |
| 2016/0059703 | A1* | 3/2016 | Miller ................ B60L 3/0015 701/22 |
| 2016/0059864 | A1 | 3/2016 | Feit et al. |
| 2016/0101780 | A1 | 4/2016 | Park |
| 2016/0107527 | A1 | 4/2016 | Amano |
| 2016/0257288 | A1* | 9/2016 | Miller ................ B60T 1/10 |

OTHER PUBLICATIONS

Kircher et al. "Continuous Versus Intermittent Presentation of Visual Eco-Driving Advice" *VTI* (*Swedish National Road and Transport Research Institute*); Transportation Research Part F 24; pp. 27-38; 2014.

Kleine-Besten et al. "Navigation and Transport Telematics" *Handbook of Driver Assistance Systems*; pp. 1-35, 2015.

Koopmann et al. "Identification of Traffic States from Onboard Vehicle Sensors" *SAE International*; 8 pages; Aug. 7, 2016.

Leonard et al. "A Perception-Driven Autonomous Urban Vehicle" *Journal of Field Robotics*; vol. 25 No. 10; pp. 727-774; 2008.

Nozaki et al. "Effect of Active Effort in Eco-Driving Support System on Proficiency of Driving Skill" *SICE Annual Conference 2012*; pp. 646-651; 2012.

Seewald et al. "D13.1: Evaluation Plan and Scenario Definition" *ecoDriver Project* Retrieved from www.ecodriver-project.eu; Version 9; pp. 1-173; Mar. 10, 2014.

\* cited by examiner

COASTING GUIDANCE TIMING AND DRIVE FORCE ADJUSTMENT

BACKGROUND

1. Field

This specification relates to a system and a method for adjusting coasting guidance and control.

2. Description of the Related Art

Drivers may increase fuel efficiency by adjusting their driving behavior. For example, a driver may coast while driving to conserve fuel. Vehicle coasting involves allowing the vehicle to progress, propel or otherwise move without use of propelling power. That is, the driver may drive without engaging the vehicle's engine or battery. For example, the vehicle may move using inertia and/or gravity. By relying on inertia and/or gravity to propel the vehicle, the vehicle does not consume fuel or electrical energy to propel the vehicle.

A vehicle that coasts towards a stop sign may require additional braking to completely stop or slow the vehicle. A driver lacks the ability to gauge when to begin coasting to stop at or within proximity of the stop sign or traffic light. For example, if the driver begins to coast too early, the vehicle may stop before reaching the stop sign or if the driver begins to coast too late, the driver may have to apply both the regenerative brakes and/or energy dissipation brakes, such as hydraulic brakes or friction brakes, to stop at the stop sign. The application of energy dissipation brakes results in the loss of energy that could have been captured by the regenerative brakes and stored. Additionally, if a driver begins coasting early, other vehicles may closely follow the driver causing the driver discomfort.

Accordingly, there is a need for a system and a method for providing coasting guidance and control to the driver to improve fuel efficiency and/or improve driver comfort.

SUMMARY

In general, one aspect of the subject matter described in this specification is embodied in a coasting guidance system for controlling a deceleration drive force of a vehicle. The coasting guidance system includes a user interface for displaying coasting information. The coasting guidance system includes an electronic control unit coupled to the user interface and configured to determine a location of a stop event. The electronic control unit is configured to determine a braking location and a target speed based on the location of the stop event. The electronic control unit is configured to determine an ideal coasting location based on the braking location and determine an actual coasting location. The actual coasting location is where the driver begins coasting. The electronic control unit is configured to control a deceleration drive force of the vehicle to decelerate the vehicle to the target speed at the braking location based on the braking location, the actual coasting location and the ideal coasting location.

These and other embodiments may optionally include one or more of the following features. The coasting guidance system may include a navigation unit configured to provide at least one of vehicle information or navigational map information. The vehicle information may include a current speed of the vehicle. The navigational map information may include the location of the stop event.

The coasting guidance system may include a navigation unit that may be configured to obtain a current location of the vehicle. The memory may be configured to store multiple locations of stop events. The electronic control unit may be configured to compare the current location of the vehicle to the multiple locations of stop events stored in the memory to determine the location of the stop event. The electronic control unit may be further configured to provide a notification to the display at or within a threshold distance or time of the ideal coasting location. The notification may indicate to the driver that the driver should begin to coast. The electronic control unit may be further configured to adjust the threshold distance or time based on a driver response time previously stored in the memory.

The electronic control unit may be configured to calculate an ideal deceleration rate based on a distance that is between the ideal coasting location and the braking location and a difference between the current speed of the vehicle and the target speed. The electronic control unit may be configured to associate the ideal deceleration rate to a pre-set deceleration drive force. The electronic control unit may be configured to calculate an actual deceleration rate based on a distance that is between the actual coasting location and the braking location and the difference between the current speed of the vehicle and the target speed. The electronic control unit may determine the applied deceleration drive force based on the pre-set deceleration drive force and a ratio of the actual deceleration rate to the ideal deceleration rate. The deceleration drive force may be based on a current speed of the vehicle.

The coasting guidance system may include a braking sensor that detects when a brake of the vehicle is depressed. The coasting guidance system may include an acceleration input sensor that detects when the accelerator of the vehicle is depressed. The electronic control unit may be configured to determine when the braking sensor and the acceleration input sensor are not depressed to determine the actual coasting location.

The coasting guidance system may include one or more sensors. The one or more sensors may be configured to determine whether a surrounding vehicle is following the vehicle. The one or more sensors may be configured to determine a distance between the vehicle and the surrounding vehicle if the surrounding vehicle is following the vehicle. The electronic control unit may be further configured to determine whether the distance between the vehicle and the surrounding vehicle is less than a threshold distance. The electronic control unit is configured to adjust the ideal coasting location if the distance between the vehicle and the surrounding vehicle is less than the threshold distance.

In another aspect, the subject matter is embodied in a method for controlling a deceleration drive force of a vehicle. The method may include determining a location of a stop event. The method may include determining a braking location and a target speed for maximizing an amount of regenerative energy captured when braking the vehicle to stop at the location of the stop event. The method may include determining an ideal coasting location based on the braking location. The method may include determining an actual coasting location where the driver begins coasting. The method may include controlling the deceleration drive force of the vehicle to decelerate the vehicle to the target speed at the braking location based on the actual coasting location, the ideal coasting location and the braking location.

In another aspect, the subject matter is embodied in a coasting guidance system of a vehicle. The coasting guidance system may include a user interface for displaying coasting information including a notification indicating an ideal coasting location. The coasting guidance system may include an electronic control unit coupled to the user interface. The electronic control unit may be configured to determine the ideal coasting location based on a location of a stop event. The electronic control unit may be configured to determine that the vehicle is at or within a threshold distance of the ideal coasting location. The electronic control unit may be configured to provide the notification indicating that a driver of the vehicle should begin coasting and determine an actual coasting location where the driver begins coasting. The electronic control unit may be configured to control a deceleration drive force of the vehicle to decelerate the vehicle to stop at the location of the stop event.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for providing coasting guidance and control to the driver to improve fuel efficiency and/or improve driver comfort. Particular embodiments of the subject matter described in this specification may be implemented to realize one or more of the following advantages. A coasting guidance and control system ("coasting guidance system") for notifying a driver of an ideal coasting location and controlling the deceleration drive force of a vehicle. The coasting guidance system compensates for a driver's response time to efficiently stop the vehicle at a stop event. For example, if the driver has a delayed response to an ideal coasting location, the coasting guidance system adjusts the deceleration drive force such that the vehicle reaches an optimal braking location at a target speed to maximize the energy captured by a regenerative braking system of the vehicle. By compensating for a driver's response time, the coasting guidance system assists in capturing the maximum amount of regenerative energy that may be stored for a stop event which increases fuel efficiency of the vehicle.

Other benefits and advantages include the capability to adjust the timing of the notification of the ideal coasting location. By adjusting the timing of the notification of the ideal coasting location, the coasting guidance system may compensate for the driver's delayed response so that the driver begins coasting at the ideal coasting location which maximizes coasting and improves fuel efficiency of the vehicle. Additionally, the coasting guidance system may adjust the ideal coasting location based on the proximity of a following vehicle so that vehicle coasting is delayed to improve driver comfort. By adjusting the ideal coasting location, the coasting guidance system may provide a driver a more comfortable ride by minimizing the amount of time the vehicle is coasting and normalizing the driving experience.

Figure 1:
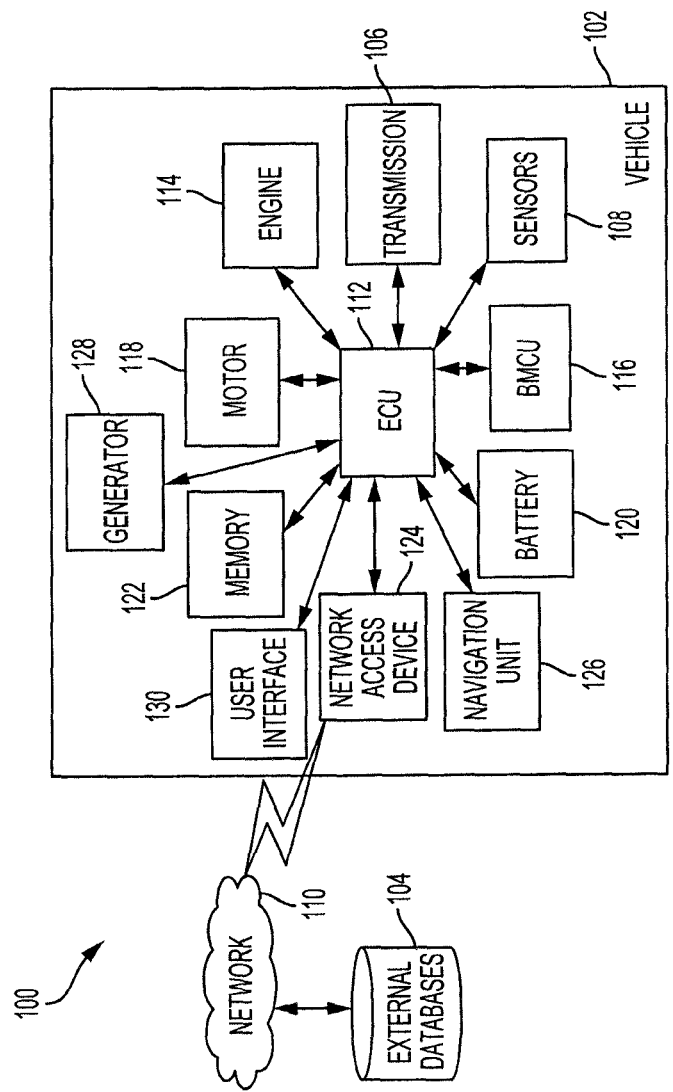
FIG. 1 is a block diagram of an example coasting guidance system for a vehicle according to an aspect of the invention.

FIG. 1 is a block diagram of an example coasting guidance system 100 for a vehicle 102. The coasting guidance system 100 may include one or more computers or electronic control units (ECUs) 112, appropriately programmed, to control coasting of the vehicle 102. The coasting guidance system 100 may include a navigation unit 126, a user interface 130, a memory 122, one or more sensors 108, a transmission 106 which controls a force or power applied to the wheels of the vehicle 102, and/or a network access device 124.

Coasting involves the propulsion of the vehicle 102 without the use of fuel or electrical energy. Other forms of energy, such as inertia or gravity, may propel the vehicle 102. The coasting guidance system 100 may provide coasting information to a driver, for example, through the user interface 130. The coasting information may include notifications, such as a notification that indicates to the driver to begin coasting, energy and mileage information related to the coasting, and/or distance information to an ideal coasting location and/or a braking location. The coasting guidance system 100 may control a deceleration drive force that controls the deceleration of a vehicle 102 while coasting.

The coasting guidance system 100 may be included in a vehicle 102 and connected to one or more external databases 104 through a network 110. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle or any other type of vehicle that includes a motor 118 and/or a generator 128. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 108 and/or the navigation unit 126 to drive autonomously.

The vehicle 102 may be coupled to a network 110. The network 110, such as a local area network (LAN), a wide area network (WAN), a cellular network, a digital short-range communication (DSRC), the Internet, or a combination thereof, connects the vehicle 102 and/or coasting guidance system 100 to the one or more external databases 104. The external databases 104 may include databases from different service providers. A service provider may provide navigational map, weather and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 104 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include political, roadway and construction information. Political information includes political features such as cities, states, zoning ordinances, laws and regulations, and traffic signs, such as a stop sign, or traffic signals. For example, laws and regulations may include the regulated speed on different portions of a road or noise ordinances. Roadway information includes road features such the grade of an incline of a road. Construction information includes construction features such as construction zones and construction hazards.

Traffic condition information includes one or more traffic condition features, such as traffic congested areas or accident areas. The traffic condition information may provide information related to the density and movement of vehicles on a roadway and/or accident locations.

Features, e.g., road features, political features, or traffic condition features, each have a location that may be identified by map coordinates. The map coordinates may be defined by latitude and longitudinal coordinates.

The vehicle 102 may include an engine 114, a motor 118, a generator 128, a battery 120 and a battery management and control unit (BMCU) 116. The motor 118 and/or the generator 128 may be an electric motor and an electric generator that converts electrical energy into mechanical power, such as torque, and converts mechanical power into electrical energy. The motor 118 and/or generator 128 may be coupled to the battery 120. The motor 118 and/or generator 128 may convert the energy from the battery 120 into mechanical power, and may provide energy back to the battery 120, for example, via regenerative braking. In some implementations, the vehicle 102 may include one or more additional power generation devices, such as the engine 114. The engine 114 combusts fuel to provide power instead of and/or in addition to the power supplied by the motor 118 and/or generator 128.

The battery 120 may be coupled to the motor 118 and/or generator 128 and may provide electrical energy to and receive electrical energy from the motor 118 and/or the generator 128. The battery 120 may include one or more rechargeable batteries.

The BMCU 116 may be coupled to the battery 120 and control and manage the charging and discharging of the battery 120. The BMCU 116, for example, may measure, using battery sensors (not shown), parameters used to determine the state of charge (SOC) of the battery 120.

The one or more ECUs 112 may be implemented as a single ECU or in multiple ECUs. The ECU 112 may be electrically coupled to some or all of the components of the vehicle 102. The ECU 112 may be coupled to at least one of the navigation unit 126, the one or more sensors 108, the network access device 124 or the memory 122. The ECU 112 may include one or more processors or controllers specifically designed for controlling one or more coasting guidance features, such as providing notifications to the driver and/or controlling the deceleration drive force of the vehicle 102. For example, the ECU 112 may determine when to notify the driver of an ideal coasting location that maximizes coasting of the vehicle 102 to a stop event.

The memory 122 may be coupled to the ECU 112. The memory 122 may store instructions to execute on the ECU 112 and may include one or more of a RAM or other volatile or non-volatile memory. The memory 122 may be a non-transitory memory or a data storage device, such as a hard disk drive, a solid-state disk drive, a hybrid disk drive, or other appropriate data storage, and may further store machine-readable instructions, which may be loaded and executed by the ECU 112. The memory 122 may store corresponding driver response times for the driver and configuration settings to enable/disable features of the coasting guidance system 100, such as the feature to adjust the notification based on driver response times or a following vehicle.

The network access device 124 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 110, to which the external databases 104 are also connected.

The one or more sensors 108 may be coupled to the ECU 112 and include a vehicle speed sensor, an acceleration input sensor, a brake sensor, and/or one or more proximity sensors. The vehicle speed sensor measures the speed of the vehicle 102, for example, by measuring the total revolutions of the wheel per minute. The brake sensor measures the amount of pressure applied to the brake pedal. The acceleration input sensor measures the amount of pressure applied to the accelerator pedal. The one or more proximity sensors may be positioned on the front and/or rear of the vehicle 102 to detect surrounding vehicles and/or objects that are within a threshold distance of the vehicle 102 in the front and/or back of the vehicle 102, respectively. The proximity sensor may use radar, a camera, vehicle-to-vehicle (V2V) communication or other means to detect and/or measure a distance to the other vehicles or objects. The one or more sensors 108 may include one or more cameras that may be used to identify a driver to determine the driver's response time and/or other driver specific configurations to control the vehicle 102.

The navigation unit 126 may be coupled to the ECU 112 and provide vehicle information and/or navigation information to the ECU 112. The vehicle information may include the current location, the direction and/or the speed of the vehicle 102. The navigation information may include a route that the vehicle 102 is or will be travelling. The route may include a starting location, a destination location and/or a path between the starting location and the destination location.

Figure 2:
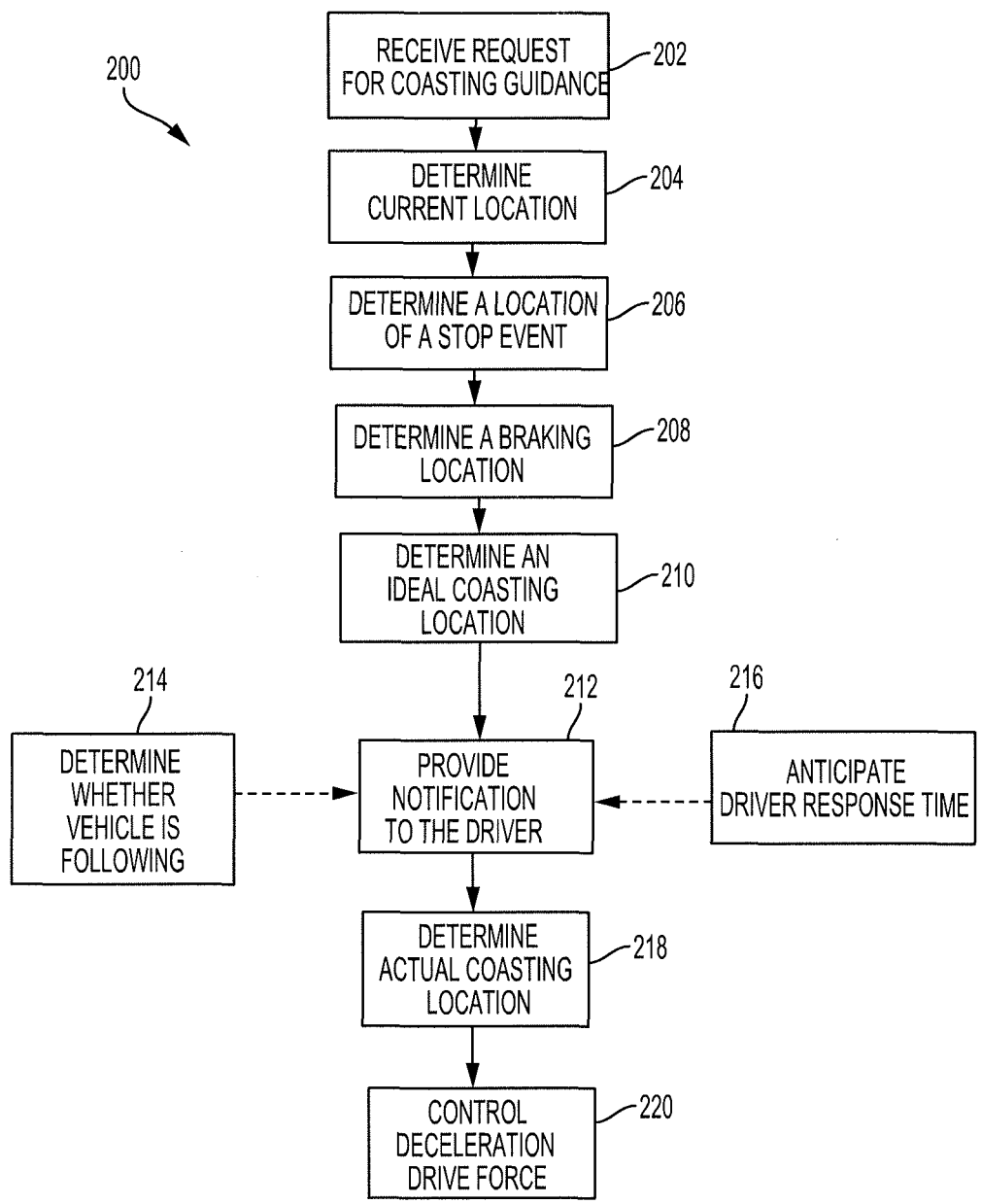
FIG. 2 is a flow diagram of an example process for controlling the deceleration drive force of the vehicle according to an aspect of the invention.

FIG. 2 is a flow diagram of an example process 200 for controlling the deceleration drive force of the vehicle 102. One or more computers or one or more data processing apparatuses, for example, the ECU 112 of the coasting guidance system 100 of FIG. 1, appropriately programmed, may implement the process 200.

The coasting guidance system 100 receives a coasting guidance request (202). The coasting guidance request is a request to initialize the coasting guidance system 100. The coasting guidance system 100 receives the coasting guidance request when the vehicle 102 becomes operational or when an occupant of the vehicle 102 activates the coasting guidance system 100.

The coasting guidance system 100 may receive the coasting guidance request from one or more sensors 108, such as an engine sensor, when the vehicle 102 is powered on. The coasting guidance system 100 may receive the coasting guidance request upon user activation, for example, when a token, such as a key, is inserted to start the vehicle 102.

The coasting guidance system 100 may determine an identity of a driver during initialization. The coasting guidance request may include the identity of the driver. The coasting guidance system 100 may receive user input, such as a user identification token, a user id or a fingerprint, which identifies the driver, to determine the identity of the driver. For example, a driver's key fob may uniquely identify the driver when the driver opens the door or is within proximity of the vehicle 102. In another example, the coasting guidance system 100 may obtain a user id from the driver, using the user interface 130, to identify the driver. The coasting guidance system 100 may use other user interface elements, such as a memory button that configures the position of a mirror or a seat, other sensors, such as a camera that uses facial recognition, or a combination of devices and/or techniques to identify the driver of the vehicle 102. The identity of the driver may be associated with a driver response time that is stored in the memory 122.

Figure 4:
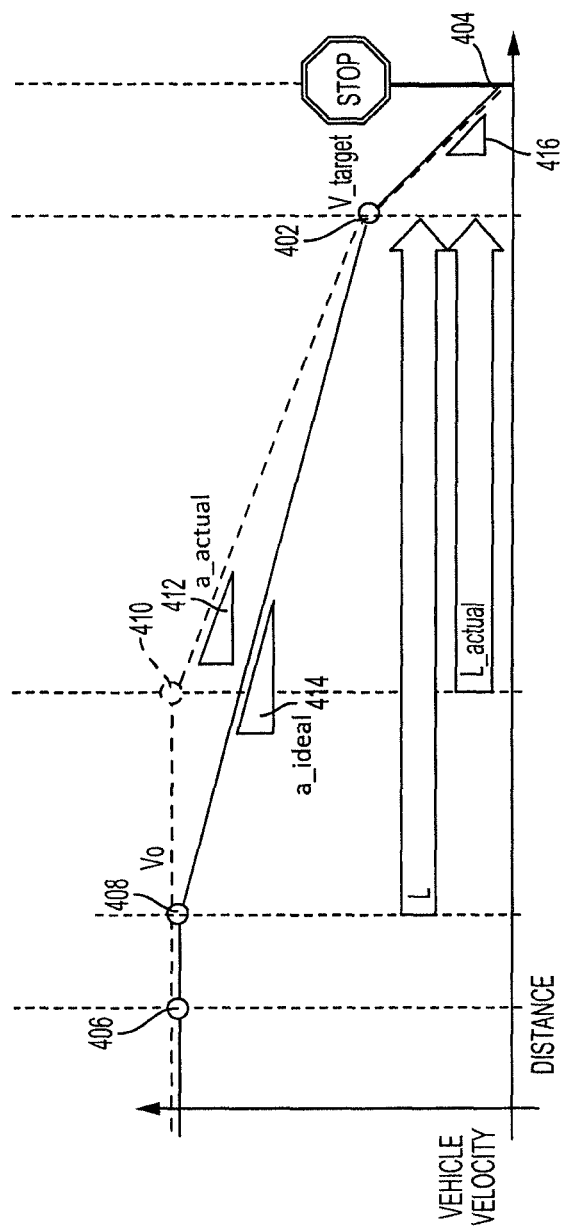
FIG. 4 is an example graph of the tuning of the deceleration drive force based on the driver response of the vehicle according to an aspect of the invention.

The coasting guidance system 100 determines the current location 406, as shown in FIG. 4, of the vehicle 102 (204). The coasting guidance system 100 may determine the current location 406 using the navigation unit 126, for example, by using the GPS device to obtain the current location of the vehicle 102.

The coasting guidance system 100 determines the location of a stop event 404 (206). A stop event 404 may be a stop sign, a traffic signal, an accident location and/or a location where traffic is at a standstill. The coasting guidance system 100 may obtain the location of the stop event 404 from navigational map information obtained by the navigation unit 126 from the one or more external databases 104 or from the one or more sensors 108. The navigation unit 126 may obtain navigational map information including the locations of one or more stop events 404, such as a stop sign, traffic, or a red traffic signal, from the one or more external databases 104 through the network 110. The navigational map information may include real-time traffic signal information. If the navigational map information indicates that the stop event is a traffic light, the coasting guidance system 100 may determine from the real-time traffic signal information the color of the traffic light when the vehicle 102 arrives at the location of the traffic light. If the coasting guidance system 100 determines that the traffic light will be green, the coasting guidance system 100 may disregard the traffic light as a stop event and determine the location of the next stop event. The coasting guidance system 100 may adjust the location of the stop event 404 based on traffic condition information, e.g., if one or more vehicles are stopped at the stop event 404. The traffic condition information may be obtained from the one or more sensors 108 or from the one or more external databases 104.

In some implementations, a sensor 108, such as a front vehicle proximity sensor, may be positioned on the front of the vehicle 102, and may be configured to detect a stop event, such as one or more vehicles in front of the vehicle 102 that are at a standstill. If the one or more vehicles that are at a standstill begin moving, the coasting guidance system 100 may determine the location of the next stop event.

In some implementations, the coasting guidance system 100 may determine the location of a stop event 404 based on a stored location of a previously travelled stop event. In a previously travelled route, the coasting guidance system 100 may determine that the vehicle 102 is stopping based on the speed of the vehicle 102. That is, the coasting guidance system 100 may determine that the speed of the vehicle 102 is below a threshold speed, such as 4 mph, and is decreasing which may indicate that the vehicle is stopping. The coasting guidance system 100 may associate the location of the vehicle 102 with a stop event and store the stop event in the memory 122 so that if the vehicle 102 approaches the location on a subsequent route the coasting guidance system 100 recalls the location of the stored stop event by comparing the current location 406 of the vehicle 102 with the location of the stored stop event that was stored. The coordinates of the vehicle 102 that are associated with the stored stop event and the current location 406 of the vehicle 102 may be obtained using the navigation unit 126. The coasting guidance system 100 may count a number of times that the vehicle 102 stops or partially stops at a location or within a range of the location, and store the location as a stop event if the number of times that the vehicle 102 stops or partially stops at the location or within the range of the location is greater than or equal to a threshold value. A partial stop may be, for example, when the vehicle 102 slows down to turn but does not completely stop. The coasting guidance system 100 may decrease the number of times that the vehicle 102 stops or partially stops at a location or within the range of the location if the vehicle 102 drives through the location without stopping or partially stopping. The coasting guidance system 100 may forget or remove a stored stop event if the number of times that the vehicle 102 stops or partially stops at a location or within the range of the location is below a threshold value.

The one or more sensors 108 may detect if there are vehicles in front of the vehicle 102. If there are no vehicles in front of the vehicle 102, the coasting guidance system 100 may determine that the vehicle 102 is stopping due to a stationary stop event, such as a traffic sign, and not an arbitrary stop event, such as traffic, that may not be present in a subsequent route. The coasting guidance system 100 may differentiate between stationary and arbitrary stop events when storing the stop events. The coasting guidance system 100 may use a combination of stored stop events and/or navigational map information to determine the location of the one or more stop events 404.

The coasting guidance system 100 determines a braking location 402 and a target speed (208). The target speed and/or the braking location 402 may be based on an approach speed determined from statistical analysis of driver behavior patterns associated with eco-braking. The target speed may be in a range of 5-8 mph, for example. The braking location 402 may be based on a specific deceleration rate 416 in which the vehicle 102 maintains regenerative braking. The braking location 402 may be a location that maximizes the amount of energy that is recaptured by the regenerative brakes if the driver initiates braking at the braking location 402 and the vehicle 102 is travelling at the target speed. That is, when the brake is depressed at the braking location 402 when the vehicle 102 is travelling at the target speed, the vehicle 102 achieves full regenerative braking by ensuring that the braking power requested by the driver does not exceed the maximum regenerative power limit which maximizes the amount of energy that is captured by the regenerative brakes. In some implementations, the coasting guidance system 100 may compensate for a rolling stop when the coasting guidance system 100 determines the braking location 402 and the target speed. In some implementations, the coasting guidance system 100 may determine the braking location 402 and the target speed further based on a road condition, such a road grade level, and/or the load of the vehicle 102.

The coasting guidance system 100 determines an ideal coasting location 408 based on a current speed of the vehicle 102 and the braking location 402 (210). The coasting guidance system 100 determines an ideal coasting location 408 by calculating the distance needed for the vehicle 102 to decelerate using a pre-set deceleration drive force to reach the target speed at the braking location 402. The pre-set deceleration drive force may be based on a deceleration map and the current speed of the vehicle 102. In some implementations, the braking location 402 and the location of the stop event 404 are the same location, and the target speed is 0 mph.

The coasting guidance system 100 may obtain the current speed of the vehicle 102 from the vehicle information. The coasting guidance system 100 may obtain the vehicle information from the navigation unit 126. For example, the navigation unit 126 may include a global positioning system (GPS) device that may track and provide a current location of the vehicle 102 and/or a current speed of the vehicle 102. In some implementations, the coasting guidance system 100 may obtain the vehicle information from a vehicle speed sensor that may provide the current speed of the vehicle 102.

The coasting guidance system 100 provides a notification to the driver that indicates to the driver to begin coasting when the vehicle 102 is at or within a threshold distance of the ideal coasting location 408 (212). The coasting guidance system 100 compares the current location 406 of the vehicle 102 to the ideal coasting location 408. If the current location of the vehicle 102 is at or within a threshold distance of the ideal coasting location 408, the coasting guidance system 100 notifies the driver to begin coasting, for example, through the user interface 130.

In some implementations, the coasting guidance system 100 anticipates a driver response time and adjusts when to provide the notification to the driver based on the driver response time (216). The coasting guidance system 100 may measure and store a driver response time between a notification of an ideal coasting location 408 for a previously travelled stop event and the beginning of the vehicle 102 actually coasting for the previously-travelled stop event. The driver response time may be associated with the identity of the driver, and stored as a measure of time. In a subsequent stop event, the coasting guidance system 100 may adjust the timing of the notification based on the stored driver response time that is associated with the driver. For example, if a driver takes approximately four (4) seconds to begin coasting after seeing the notification at a previously travelled stop event, the coasting guidance system 100 may send the notification at a location that is a distance equivalent to four (4) seconds of travel, e.g., approximately 0.033 miles if the vehicle 102 is traveling at 30 mph, before the ideal coasting location 408 associated with a subsequent stop event so that when the driver begins to coast the vehicle 102 will be at or near the ideal coasting location 408.

The coasting guidance system 100 may adjust when to provide the notification to the driver based on whether another vehicle is following the vehicle 102 (214). The process of adjusting the timing of the notification based on a following vehicle is further described in FIGS. 5-7.

The coasting guidance system 100 determines the actual coasting location 410 based on input from the one or more sensors 108 (218). The coasting guidance system 100, using the brake sensor and the acceleration input sensor, may determine whether the brakes and/or the accelerator are depressed. If the brakes or the accelerator is depressed, e.g., the brake sensor and/or the accelerator input sensor indicate that the driver is applying pressure to the brake and/or the accelerator, the coasting guidance system 100 determines that the vehicle 102 is not coasting. If the brakes and the accelerator are not depressed, the coasting guidance system 100 determines that the vehicle 102 is coasting. The coasting guidance system 100 uses the location of when the driver released pressure from the brake and/or the accelerator as the actual coasting location 410 to determine an applied deceleration drive force to decelerate the vehicle 102 to the target speed at the braking location 402.

The coasting guidance system 100 controls the deceleration drive force to coast from the actual coasting location 410 to the braking location 402 and decelerate to the target speed from the current speed (220). By controlling the deceleration drive force, the coasting guidance system 100 compensates for the difference between the actual coasting location 410 and the ideal coasting location 408. Otherwise, if the driver has a delayed response that delays actual coasting until after the ideal coasting location, the vehicle's speed at the braking location 402 will be greater than the target speed which will require use of the energy dissipation brakes to stop the vehicle 102 at the location of the stop event 404. If the driver begins coasting prior to the ideal coasting location 408, the vehicle's speed at the braking location 402 will be less than the target speed and the vehicle 102 will either stop before the location of the stop event 404 and/or the driver will capture less than the maximum amount of electrical energy from the regenerative brakes if the deceleration drive force is not adjusted. The control of the deceleration drive force is further described in FIGS. 3-4.

Figure 3:
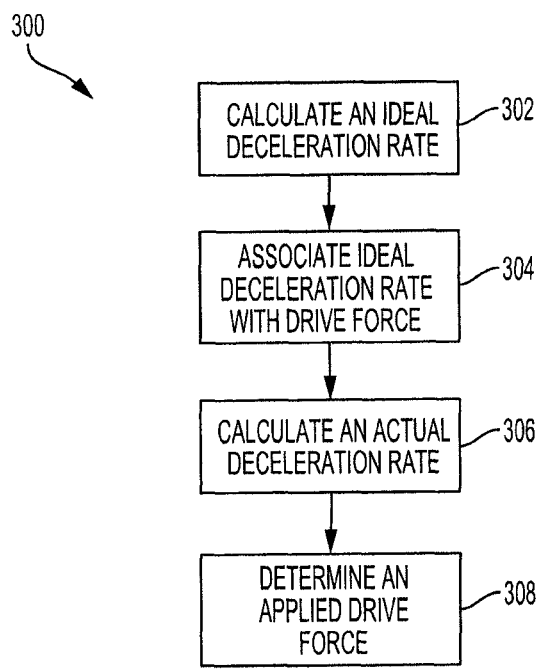
FIG. 3 is a flow diagram of an example process for determining the deceleration drive force for coasting of the vehicle according to an aspect of the invention.

FIG. 3 is a flow diagram of an example process 300 for determining an applied deceleration drive force for coasting of the vehicle 102 so that the vehicle 102 arrives at the braking location 402 at the target speed. One or more computers or one or more data processing apparatuses, for example, the ECU 112 of the coasting guidance system 100 of FIG. 1, appropriately programmed, may implement the process 300.

The coasting guidance system 100 may calculate an ideal deceleration rate 414 to determine a pre-set deceleration drive force (302). The coasting guidance system 100 may calculate the ideal deceleration rate 414, $a_{ideal}$, based on the ideal coasting location 408, the braking location 402, the current speed, $v_0$, of the vehicle 102 and the target speed, $v_{target}$. The coasting guidance system 100 may calculate a distance, L, between the ideal coasting location 408 and the braking location 402 and a difference between the current speed of the vehicle 102 and the target speed to determine, using a kinematics equation and assuming a constant acceleration, the ideal deceleration rate 414, $a_{ideal}$, where $$a_{ideal} = \frac{v_0^2 - v_{target}^2}{2L}.$$

The coasting guidance system 100 may associate the ideal deceleration rate 414 with a pre-set deceleration drive force, $DF_{pre-set}$ (304). The pre-set deceleration drive force may vary based on the current speed of the vehicle 102 and the type of vehicle. The coasting guidance system 100 may use a deceleration map to map the current speed of the vehicle 102 to a pre-set deceleration drive force.

The coasting guidance system 100 may calculate an actual deceleration rate 412, $a_{actual}$, based on the actual coasting location 410, the braking location 402, the current speed of the vehicle 102 and the target speed (306). The coasting guidance system 100 may calculate a distance, $L_{actual}$, between the actual coasting location 410 and the braking location 402 and a difference between the current speed of the vehicle 102 and the target speed to determine the actual deceleration rate 412, $a_{actual}$ where $$a_{actual} = \frac{v_0^2 - v_{target}^2}{2L_{actual}}.$$

The ideal deceleration rate 414 and the actual deceleration rate 412 may be further based on the vehicle road load, road grade and/or drag force contribution.

The coasting guidance system 100 may determine an applied deceleration drive force, $DF_{applied}$, based on the ideal deceleration rate 414, the actual deceleration rate 412 and the pre-set deceleration drive force (308). The applied deceleration drive force may be linearly proportional to the pre-set deceleration drive force where the constant is a ratio of the actual deceleration rate 412 to the ideal deceleration rate 414. That is, $$DF_{applied} = \left(\frac{a_{actual}}{a_{ideal}}\right) * DF_{pre-set}.$$

The applied deceleration drive force may have a minimum and/or a maximum limit.

The coasting guidance system 100 may obtain weather information from one or more external databases 104 and/or the incline of the road from the navigational map information, and adjust the actual applied deceleration drive force based on the weather information and/or incline of the road. For example, a smaller deceleration drive force is needed to slow down the vehicle 102 when travelling uphill. The coasting guidance system 100 may further adjust the actual applied deceleration drive force based on real-time factors, such as the flow of traffic or a change in the state of a stop event. For example, if a traffic signal turns green and there is no longer a stop event as the vehicle 102 approaches the location of the stop event, the coasting guidance system 100 may reduce the deceleration drive force so that the vehicle 102 coasts longer.

Figure 5:
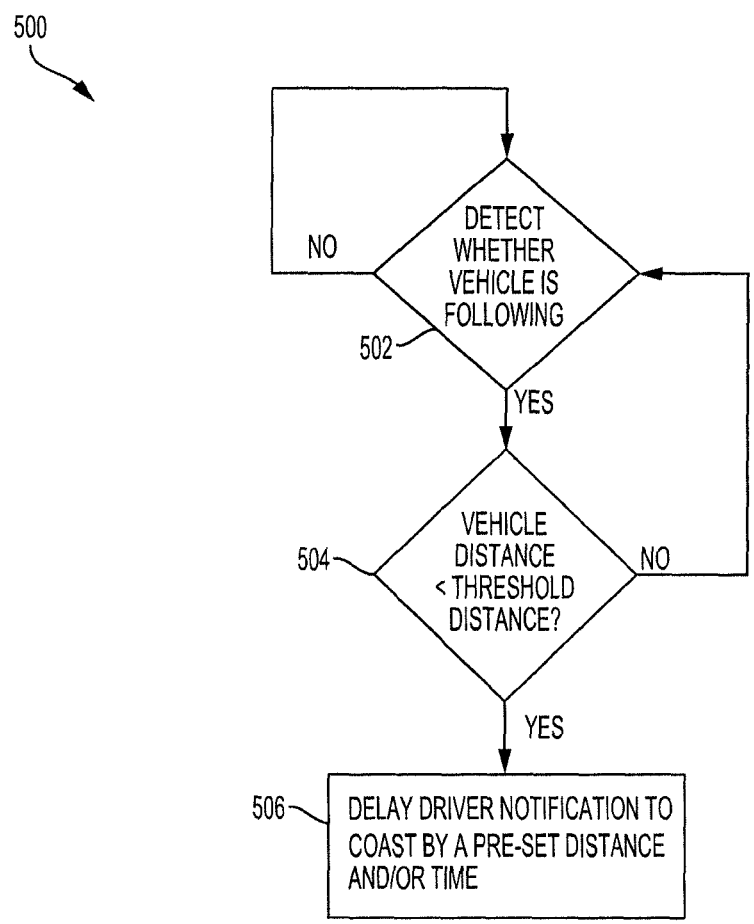
FIG. 5 is a flow diagram of an example process for adjusting the coasting notification of a vehicle according to an aspect of the invention.

FIG. 5 is a flow diagram of an example process 500 for adjusting the coasting notification of the vehicle 102. One or more computers or one or more data processing apparatuses, for example, the ECU 112 of the coasting guidance system 100 of FIG. 1, appropriately programmed, may implement the process 500.

The coasting guidance system 100 may detect whether a vehicle is following the vehicle 102 (502). The coasting guidance system 100 may use one or more sensors 108, e.g., a rear proximity sensor that is positioned at the rear of the vehicle 102, vehicle-to-vehicle (V2V) communications or one or more cameras, to detect whether a vehicle is following the vehicle 102. If there is no vehicle following the vehicle 102, the coasting guidance system 100 may continue to monitor the environment surrounding the vehicle 102 for vehicles.

If there is a vehicle following the vehicle 102, the coasting guidance system 100 may determine whether the distance between the following vehicle and the vehicle 102 is less than a threshold distance (504). The threshold distance may be a variable distance, e.g., approximately equivalent to 3 seconds between the two vehicles based on the difference in speed of the vehicles, or a fixed distance, e.g., about 8 feet.

If the coasting guidance system 100 determines that the distance between the following vehicle and the vehicle 102 is less than the threshold distance, the coasting guidance system 100 may delay when to provide a notification to the driver to begin coasting (506). The delay may be a pre-set distance and/or time. The coasting guidance system 100 may compare the ideal coasting location to a current location and/or a time that the notification would have previously been sent and a current time of the vehicle 102 to adjust when the coasting guidance system 100 sends the notification.

Figure 6:
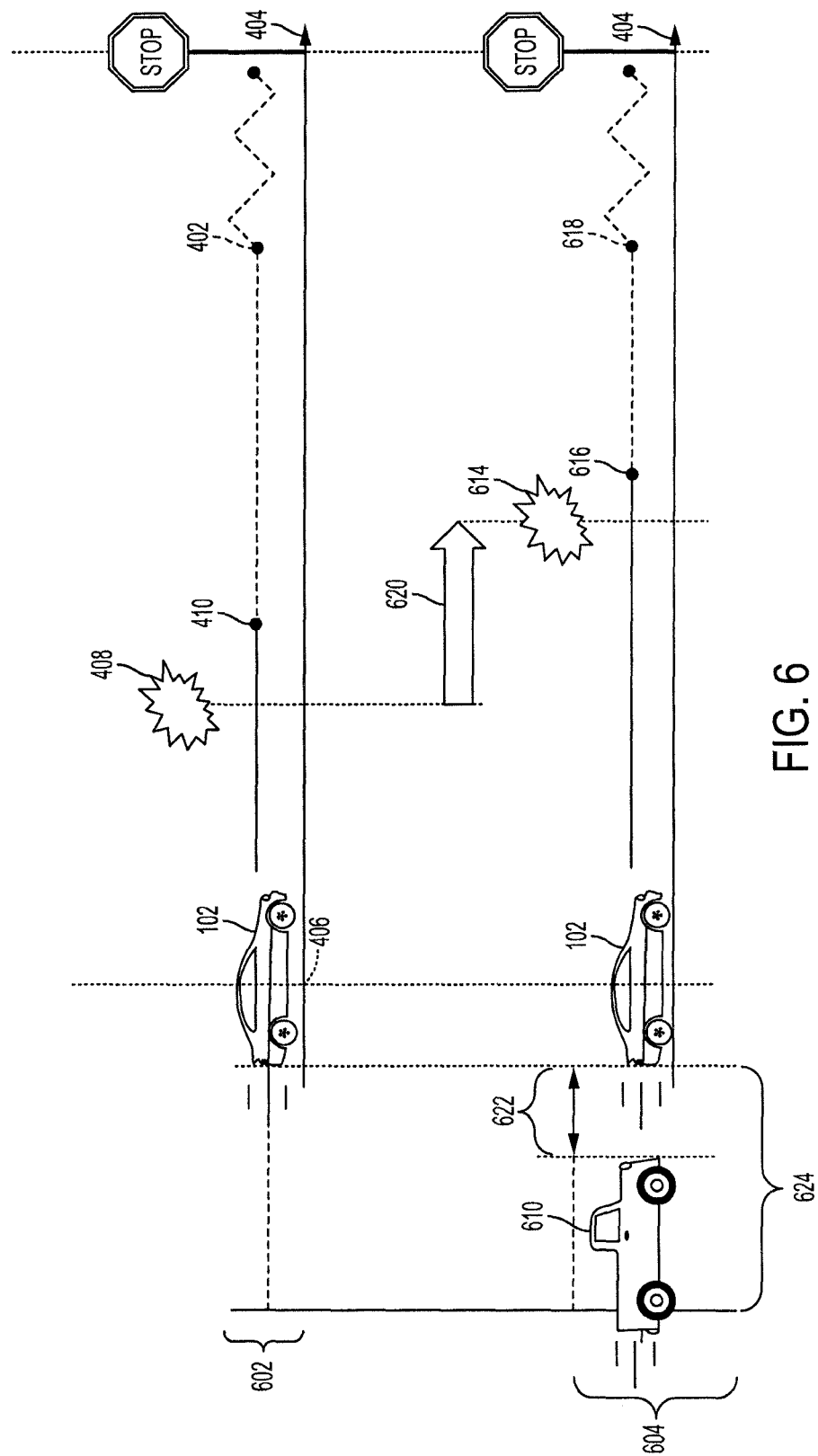
FIG. 6 is an example illustration of tuning the coasting notification of a vehicle according to an aspect of the invention.
Figure 7:
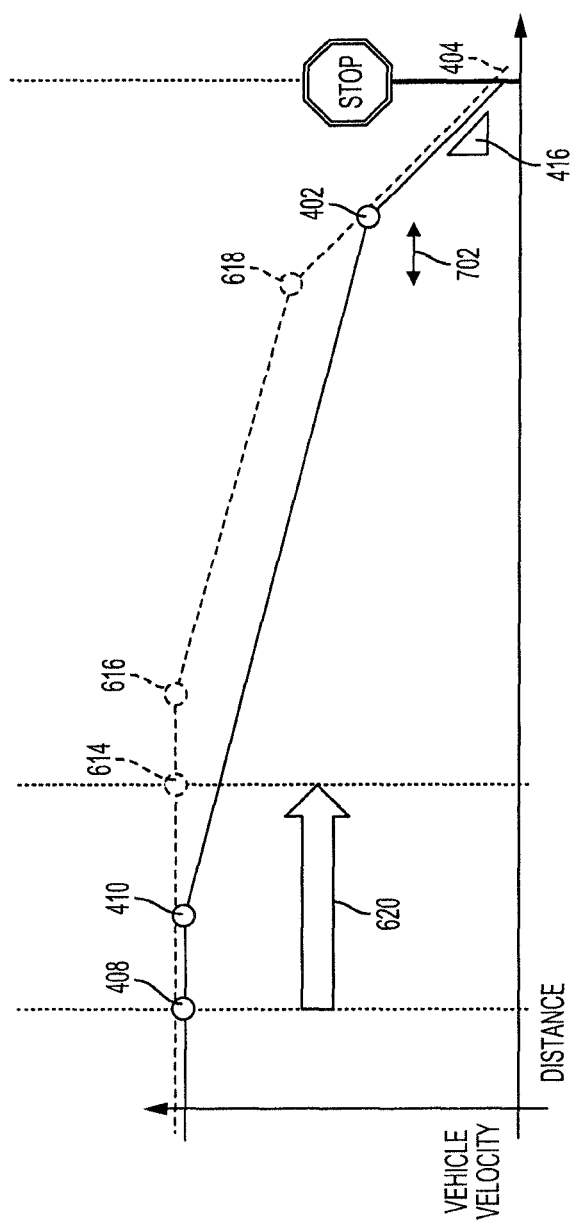
FIG. 7 is an example graph of the tuning of the coasting notification of a vehicle according to an aspect of the invention.

FIG. 6 is an example graphical illustration of the tuning of the coasting notification of the vehicle 102, and FIG. 7 is an example graph of the tuning of the notification of the vehicle. As shown in FIG. 6, the vehicle 102 on the first path 602 receives a notification to begin coasting at the ideal coasting location 408 since there is no vehicle following. The driver begins coasting at the actual coasting location 410 of the first path 602 and coasts until the reaching the braking location 402 to stop at the location of the stop event 404. The coasting guidance system 100 may adjust the ideal coasting location 614 of the second path 604 so that the notification is delayed if the vehicle 610 is following the vehicle 102 and the distance 622 between the two vehicles is less than the threshold distance 624. As a result, the actual coasting location 616 of the second path 604 is delayed which gives the driver of the vehicle 102 the feeling of a normal driving experience that typically involves less coasting. The amount of delay of the notification of the ideal coasting location 614 may be limited to a threshold delay to prevent the driver of the vehicle 102 from braking and/or coasting too late to stop at the location of the stop event 404. As shown in FIG. 7, the braking location 618 may be adjusted a distance 702 from the braking location 402 based on the delayed tuning of the notification. The braking of the vehicle 102 at the braking location 618 may require use of the energy dissipation brakes to stop at the location of the stop event 404.

In some implementations, the coasting guidance system 100 adjusts the applied deceleration drive force so that the vehicle 102 decelerates to the target speed at the braking location 402. By adjusting the applied deceleration drive force, the coasting guidance system 100 controls the vehicle 102 so that a driver may brake at the target speed and braking location 402 instead of the location 618 based on statistical analysis of driver behavior patterns associated with eco-braking.

The amount of delay 620 in providing the notification to the driver may be based on the distance between the vehicle 102 and following vehicle 610. For example, if the following vehicle 610 is only a foot away from the vehicle 102, the coasting guidance system 100 may delay the notification as long as possible so that the vehicle 102 only coasts for a minimum amount of time until the vehicle 102 reaches the braking location 618 so that the deceleration of the vehicle 102 feels normal to the driver and the amount of time coasting is minimized. In another example, if the following vehicle 610 is several feet away from the vehicle 102, the coasting guidance system 100 may only introduce a minimal delay in the notification so that coasting may begin sooner.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A coasting guidance system for controlling a coasting deceleration drive force that affects a deceleration of a vehicle when the vehicle coasts, comprising:
   an electronic control unit configured to:
      determine a location of a stop event,
      determine a braking location and a target speed where when a brake is depressed an applied braking power is less than or equal to a regenerative power limit and the brake stops the vehicle at the location of the stop event,
      determine an ideal coasting location based on the braking location,
      determine an actual coasting location where the vehicle begins coasting, and
      determine the coasting deceleration drive force that affects the deceleration of the vehicle based on the braking location, the target speed, the actual coasting location, and the ideal coasting location; and
   a transmission configured to decelerate the vehicle to the target speed at the braking location using the coasting deceleration force.

2. The coasting guidance system of claim 1, further comprising:
   a global positioning system (GPS) configured to provide at least one of vehicle information or navigational map information, wherein the vehicle information includes a current speed of the vehicle and the navigational map information includes the location of the stop event.

3. The coasting guidance system of claim 1, further comprising:
   a global positioning system (GPS) configured to obtain a current location of the vehicle; and
   a memory configured to store a plurality of locations of stop events;
   wherein to determine the location of the stop event the electronic control unit is configured to compare the current location of the vehicle to the plurality of locations of stop events stored in the memory.

4. The coasting guidance system of claim 1, further comprising:
   a display for providing a notification to a driver;
   wherein the electronic control unit is further configured to:
      provide a notification to the display at or within a threshold distance or time of the ideal coasting location, wherein the notification indicates to the driver that the vehicle should begin to coast.

5. The coasting guidance system of claim 4, wherein the electronic control unit is further configured to:
   adjust the threshold distance or time based on a driver response time previously stored in a memory.

6. The coasting guidance system of claim 1, wherein to determine the coasting deceleration drive force the electronic control unit is configured to:
   calculate an ideal deceleration rate based on a distance that is between the ideal coasting location and the braking location and a difference between a current speed of the vehicle and the target speed;
   associate the ideal deceleration rate to a pre-set deceleration drive force;
   calculate an actual deceleration rate based on a distance that is between the actual coasting location and the braking location and the difference between the current speed of the vehicle and the target speed; and
   determine an applied deceleration drive force based on the pre-set deceleration drive force and a ratio of the actual deceleration rate to the ideal deceleration rate.

7. The coasting guidance system of claim 1, further comprising:
   a braking sensor that detects when the brake of the vehicle is depressed; and
   an acceleration input sensor that detects when an accelerator of the vehicle is depressed;
   wherein to determine the actual coasting location the electronic control unit is configured to determine when the brake and the accelerator are not depressed.

8. The coasting guidance system of claim 1, wherein the coasting deceleration drive force is further based on a current speed of the vehicle.

9. The coasting guidance system of claim 1, further comprising:
   one or more sensors configured to:
      determine whether a surrounding vehicle is following the vehicle; and
      determine a distance between the vehicle and the surrounding vehicle if the surrounding vehicle is following the vehicle.

10. The coasting guidance system of claim 9, wherein the electronic control unit is further configured to:
    determine whether the distance between the vehicle and the surrounding vehicle is less than a threshold distance; and
    adjust the ideal coasting location if the distance between the vehicle and the surrounding vehicle is less than the threshold distance.

11. A method for controlling a coasting deceleration drive force of a vehicle, comprising:
    determining a location of a stop event;
    determining a braking location and a target speed for maximizing an amount of regenerative energy captured when braking the vehicle to stop at the location of the stop event;
    determining an ideal coasting location based on the braking location;
    providing a notification to a display at or within a threshold distance or time of the ideal coasting location based on a driver response time associated with an identity of a driver and stored in memory;
    determining an actual coasting location where the vehicle begins coasting; and
    controlling the coasting deceleration drive force of the vehicle based on the target speed, the actual coasting location, the ideal coasting location and the braking location.

12. The method of claim 11, wherein controlling the coasting deceleration drive force includes:
    calculating an ideal deceleration rate based on a distance that is between the ideal coasting location and the braking location and a difference between a current speed of the vehicle and the target speed;

associating the ideal deceleration rate to a pre-set deceleration drive force;

calculating an actual deceleration rate based on a distance that is between the actual coasting location and the braking location and the difference between the current speed of the vehicle and the target speed; and determining an applied deceleration drive force based on the pre-set deceleration drive force and a ratio between the actual deceleration rate and the ideal deceleration rate, the applied deceleration drive force having a minimum limit and a maximum limit.

13. The method of claim 12, wherein associating the ideal deceleration rate to the pre-set deceleration drive force is based on a deceleration map.

14. The method of claim 11, wherein determining the location of the stop event includes obtaining the location of the stop event from memory where the location of the stop event was previously stored.

15. The method of claim 11, wherein the notification indicates that the driver should begin to coast.

16. The method of claim 11, wherein determining the actual coasting location includes determining that an accelerator pedal and a brake pedal are not depressed for a threshold amount of time.

17. A coasting guidance system for a first vehicle, comprising:

one or more sensors for detecting a second vehicle within a threshold distance of the first vehicle;

an electronic control unit coupled to the one or more sensors and configured to:

determine an ideal coasting location based on a location of a stop event, determine that the second vehicle is behind and within the threshold distance of the first vehicle, adjust the ideal coasting location, delay a timing of when a notification indicating that a driver of the first vehicle should begin coasting is provided to the driver due to the second vehicle being behind and within the threshold distance of the first vehicle and based on the adjusted ideal coasting location, determine an actual coasting location where the vehicle begins coasting, and determine a coasting deceleration drive force of the first vehicle to decelerate the first vehicle to the location of the stop event; and a transmission configured to control the coasting deceleration drive force of the first vehicle.

18. The coasting guidance system of claim 17, further comprising:

a user interface for displaying coasting information including the notification, wherein the electronic control unit is further configured to provide the notification indicating that the driver of the first vehicle should begin coasting at the adjusted ideal coasting location to the user interface.

19. The coasting guidance of claim 17, wherein the delay of the timing of when the notification indicating that the driver of the first vehicle should begin coasting is provided to the driver is greater when a distance that the second vehicle is behind the first vehicle is a first distance than when the distance that the second vehicle is behind the first vehicle is a second distance, wherein the first distance is less than the second distance.

* * * * *